June 18, 1946.  D. B. BAUMAN  2,402,358
FLYING WING AIRCRAFT
Filed Nov. 17, 1941  2 Sheets-Sheet 1

Inventor
DOUGLAS B. BAUMAN
By
Attorney

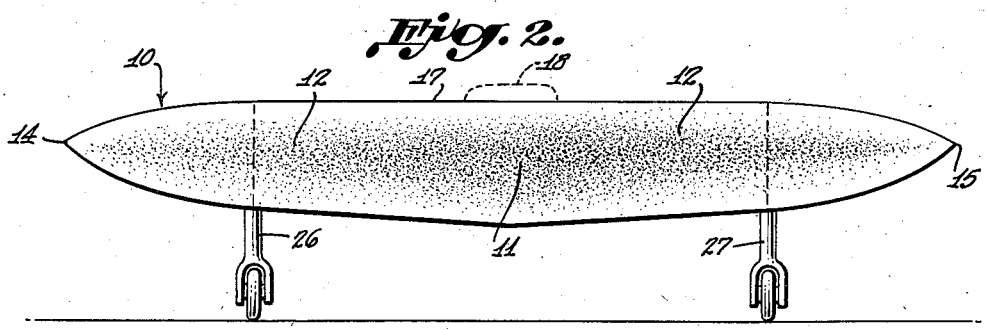
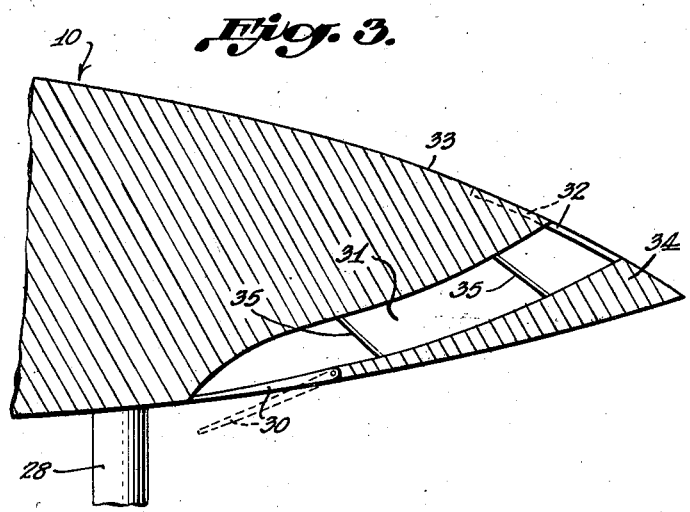
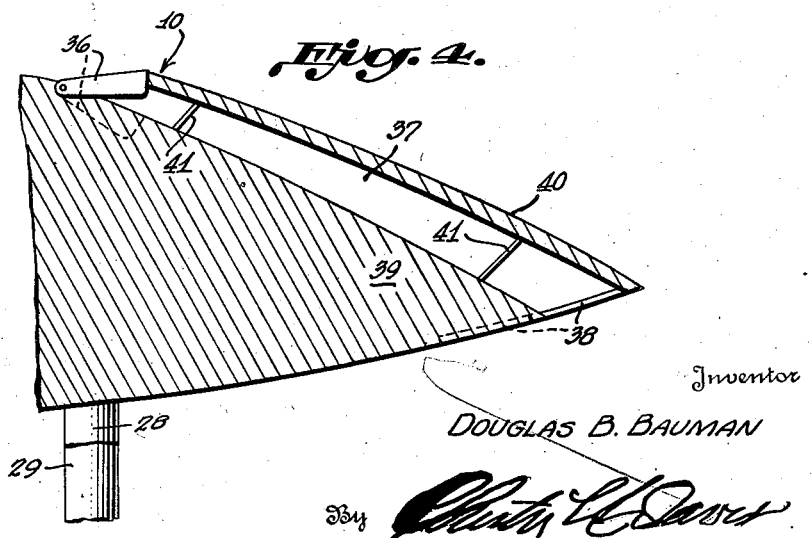

Patented June 18, 1946

2,402,358

UNITED STATES PATENT OFFICE 2,402,358

FLYING WING AIRCRAFT

Douglas Boyce Bauman, West Haven, Conn.

Application November 17, 1941, Serial No. 419,496

3 Claims. (Cl. 244—13)

My invention relates to a new tailless flying wing type of airplane and more particularly to a type known simply as a "Flying Wing." In this type of airplane the conventional design of an airplane which usually consists of a fuselage with attached wings is departed from, and in my improved type of airplane I employ as my design a single wing comprising a single continuous hollow body so shaped and proportioned as to fly most efficiently.

The object of my invention is to provide a flying wing.

Another object of my invention is to provide a flying wing wherein the various dimensions of the wing are so proportioned as to result in an airfoil body form in a commercially operable craft adequate to be self-sustaining in flight.

A further object of my invention is to provide a flying wing so designed that the interior thereof will afford heretofore unavailable carrying facilities.

A still further object of my invention is to provide a flying wing wherein my new and useful types of controls may be employed, thereby making possible the successful operation of a flying wing type of airplane.

Attempts have been made heretofore by others to design a satisfactory flying wing, all of which for one reason or another are not entirely commercially practicable. Other attempts at such a design are illustrated in the patents issued to Zimmerman 2,108,093—Burnelli 1,987,050—Adkins 1,795,990—Lesh 1,859,568—Hughes 1,841,815 —Johnson 1,887,411 and Stout 1,862,102.

A more thorough understanding may be had of my invention by reference to the accompanying drawings, wherein—

Fig. 1 illustrates a plan view showing the general shape and preferred proportions of the plane of my invention.

Figs. 1a and 1b are profile sections corresponding to the sections at lines 1a and 1b, respectively, of Fig. 1.

Fig. 2 shows a front view.

Fig. 3 is a diagrammatic view explanative of the nature and disposition of one kind of air passage extending through the rear end of the aircraft and of the controls therefor.

Fig. 4 is a diagrammatic view explanative of the disposition of a different air passage extending through the rear end of the aircraft and of the controls therefor.

Figure 1:
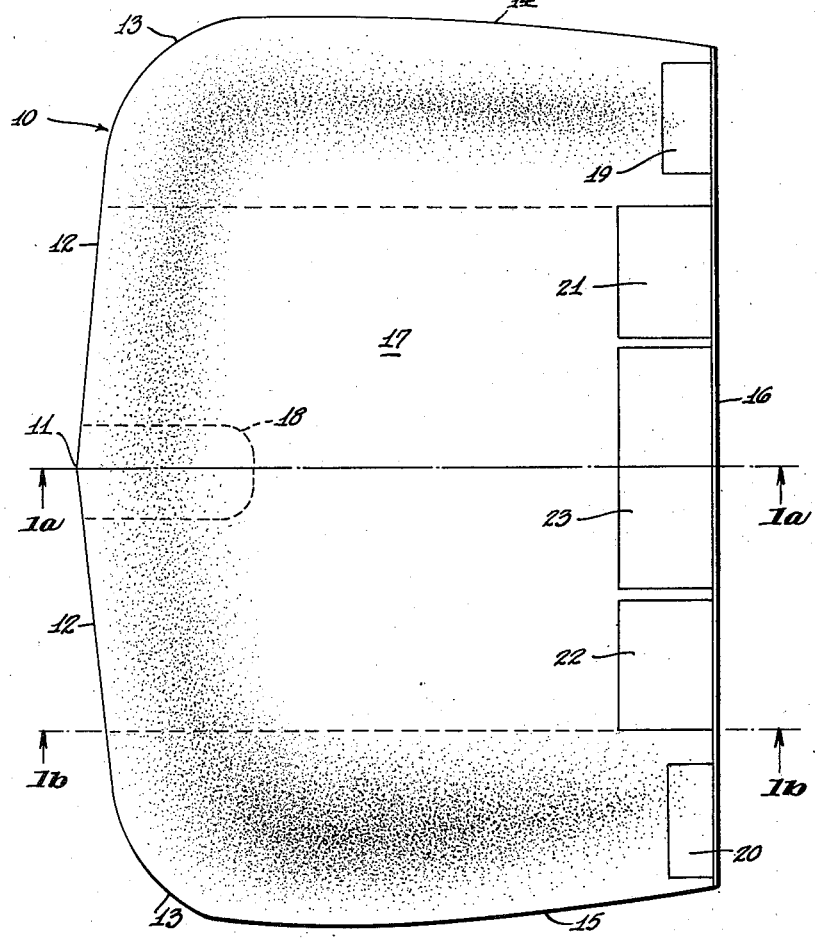
Figure 1A:
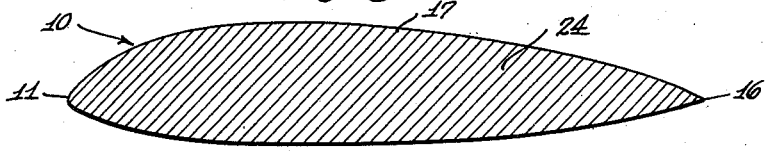
Figure 1B:
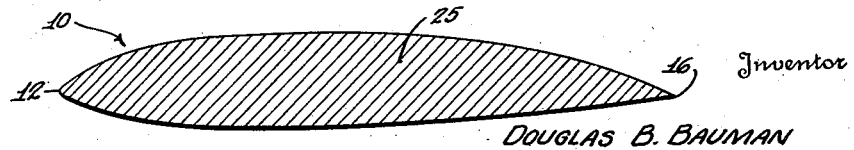

In Fig. 1 the general contour and shape of the ship is illustrated as a single continuous hollow body, defined in terms of the nose portion 11, the leading edge 12, the beginning of the curved front end sections indicated by the reference numeral 10, the curved front end sections 13, the sides 14 and 15, and the rear or trailing edge 16. The profile sections 1a and 1b are illustrated in Figs. 1a and 1b, respectively, the inner contour of the sections being designated by the reference numerals 24 and 25. The top airfoil surface is designated as 17 while the cabin or observation portion is indicated by the reference character 18. Near the substantially straight trailing edge 16 that is formed by the meeting of the top and bottom airfoil surfaces are located a number of openings or doors by means of which the plane is controlled, these being designated by the reference numerals 19, 20, 21, 22 and 23.

Fig. 2, in addition to showing the parts referred to by corresponding reference characters in Fig. 1, shows the front landing wheels 26 and 27, the rear landing wheels being similarly positioned with respect to the width of the ship and preferably aligned with the front landing wheels 26 and 27. The preferred alignment is indicated by the reference characters 28 and 29 in Fig. 4.

Figs. 3 and 4 illustrate two different types of air passages employed in the controls I utilize. In Fig. 3 is illustrated an air passage 31, the walls of which are supported by struts 35. As will be seen, these struts also constitute part of the support for the rear section 34. The reference character 10 designates the rear portion where the sloping is accentuated, this likewise being true as to Fig. 4 and as already mentioned in connection with Fig. 1. A movable door or valve 32 is provided near the upper surface and a movable door 30 is provided near the lower surface. As shown in Fig. 3, the lower valve is illustrated as a hinged member and the upper valve 32 is shown as a sliding door.

In Fig. 4 the upper valve is illustrated as a hinged door 36, the lower valve being indicated as a sliding door 38. In Fig. 4 the end portion containing the control is indicated by the reference numeral 39 while the extreme end portion is designated by the reference numeral 37 and the struts 41, spacing and supporting the end portion 40 from the main end portion 39. Different reference characters have been employed due to the different construction and especially due to the fact that the angle is opposite to that shown in Fig. 3.

The important features of the design incorporated in my improved type of flying plane are contour and general shape, air passage control within the fuselage instead of exterior ailerons, and very important ratios of dimensions with respect to width to length of the plane. These ratios will be more particularly referred to later in the specification, but it is sufficient to mention here that the ratio should be of the order of 7 to 5 and not departing greater than 6 to 5 or 8 to 5.

The construction of my new type of flying wing is in general conformity with the shape of a horseshoe with the most effective ratio concerning span to the chord length where best results are obtainable. In comparing the shape with that of a horseshoe the front of the ship would correspond to the front curved portion of the horseshoe and, of course, the rear portion corresponds approximately to what would be a line drawn between the extreme ends of the horseshoe. The relative curvatures are of considerable importance, however, of greater importance is the above-mentioned ratio of span to chord distances.

In designing a plane of this type, I have found that in order to produce a commercially successful machine one must observe the following referred to ratios and a plane which is designed on ratios departing greatly therefrom will not be stable in the air, cannot be easily maneuvered, and in many other respects will be unsatisfactory for commercial or military use.

As one will observe from Fig. 1 of the drawings the plane designed in the shape of a horseshoe has an approximate ratio of 7 to 5, span to chord, this being the most efficient ratio. The trailing edge 16 of my plane is preferably straight from one side 14, as in a horseshoe, to the other extreme side 15 in the horseshoe, thereby obtaining good stability and correct maneuverability. Without a straight trailing edge 16 correct maneuverability in addition to stability would be affected greatly. There are no movable fins or ailerons with stabilizer protruding beyond the general contour of said plane. All controls to make my plane efficient are so designed as to create the same effect as in the plane of today. My controls 19, 20, 21, 22 and 23 are within the fuselage, it being understood that in my type of plane the fuselage and the wing are one and the same thing, my controls having very small movable surfaces but being very effective. In Figs. 3 and 4 the controls diagrammatically represented in Fig. 1 are more clearly shown. In operation, as one would pull the control stick back as in a conventional ship, this would open two small surfaces or opening valves 32 and 30 in Fig. 3 or valves 36 and 38 in Fig. 4. This allows the air to strike at a pre-set angle near the trailing part or rear part 16 of the fuselage, the air stream so produced causing the lifting on the under side of the body, in accordance with the rate of climb desired. The openings 32 or 36 in Figs. 3 and 4, respectively, need not be opened when the valves 30 or 38 are opened although they may be to permit continuation of the air stream past the airfoil and obtain more rapid control. As will be seen, such flexibility provides exceeding stability during the take-off or landing periods. After the craft is in the air it is frequently desirable to partially close or sometimes to entirely close the upper opening, thereby causing the air stream to pass around the bottom surface of the body either entirely or partially, the lower opening being adjusted according to the immediate conditions of navigation. It is to be further understood that the opening in the bottom surface of the body may be closed slowly by degrees or suddenly and this may be accomplished by providing separate controls for different portions of the lower and upper openings.

In connection with the design of the controlled air passages for both horizontal stabilization and vertical stabilization the determination of the correct angle at which they are to be placed is a matter dependent upon the characteristics of performance desired. It is likewise quite possible to make the position of these air passages adjustable so that they can be pre-set before operation of the plane.

It is necessary to keep in mind the commercial application of any plane which may apparently be theoretically correct in design. While many variations in design are permissible without departing from the contours and ratios I specify, it must be borne in mind that the departures must not be too great. In general the top and bottom airfoil surfaces of the body meet and form a trailing edge and continuous additional edges joining said trailing edge to delineate a plan shape of body wider than its chordal length and possessing an aspect ratio less than 2, being narrower at the trailing edge than is the maximum body width. The interior of the plane may comprise certain struts over which a covering of phenol-condensation product or plastic or fabric or metal is applied. The framework in the design I have illustrated should be such as to provide standing room for a considerable number of occupants. As an illustration, in the design chosen, the height for the average central portion is 6 feet, the width for the major portion of the ship affording this same height is likewise 6 feet and the length affording this same height being considerably more than 6 feet, namely, approximately 26 feet. In other words, all dimensions should be increased proportionately for a larger ship and reduced proportionately for a smaller ship. The portion beginning from the nose section 11 of the ship where the 6 foot height begins, should be approximately $\frac{2}{10}$ the total length of the ship, the section extending further along the length which would afford a 6 foot space would continue for approximately $\frac{5}{10}$ of the length, the remaining portion from the 6 foot height to the trailing edge 16 of the ship being $\frac{3}{10}$ of the total length, the total length being approximately 40 to 44 feet. With respect to the width the 6 foot portion as heretofore mentioned extends for a distance of 40 feet and the portions on either side of this area of 6 foot height to the side tips 14 and 15 on either side of the plane would be approximately 10 feet, meaning that the end portions where the taper begins to the side of the ship is approximately in each case ⅙ the total width.

For maneuverability different air passages are provided having a general construction as referred to above, these being openings distributed along the straight trailing edge of the craft extending from one airfoil surface to the other and controlled by doors generally illustrated as 19, 20, 21, 22 and 23 in Fig. 1. The air is caused to go through these openings at a determined angle in order to turn, elevate or descend the plane as desired. At least one of these passageways slants rearward and downward while another passageway slants rearward and upward. The passageways are disposed in number and arrangement to enable the total upward flow of air as well as the total downward flow of air to be equalizable in pitch effect on opposite sides of the vertical plane of symmetry of the aircraft.

The control doors of the passageways may be situated at the extreme side or front portions instead of or in addition to being located in the end portions of the ship. They are preferably, in the majority of cases, located in the sections not generally utilized for the main portion of the cargo, accordingly there remains very little waste space.

My flying wing may be propelled by conventional motors and screw propellers as is generally known and in use today. Either a single motor and propeller near the central front portion 11 of the ship may be employed or any number may be aligned along the nose or leading edge 12 of the plane.

The landing gear on my type of plane is preferably of the four point type although it is feasible to employ a minimum of a three point or of course as many points more than four might be used should the design or use intended call for a more elaborate arrangement. In present day planes, however, it should be borne in mind that the width of the landing gear is not relatively great and that this feature is of considerable importance with respect to proper landing of the craft. In the design of my invention the four points of landing contact may be located in the extreme portions near the front edge 12 and rear edge 16 near both sides 14 and 15 of the body.

It is understood that many modifications can be made in the construction of a satisfactory type of flying wing aircraft other than that illustrated or described in the accompanying application without departing from the spirit of my invention, more particularly defined in the following claims.

I claim:

1. An aircraft of the tailless flying wing type comprising a single continuous hollow body of adequate airfoil form to be fully self-sustaining in flight having top and bottom airfoil surfaces meeting to form a substantially straight trailing edge and to form continuous additional edges joining said trailing edge to delineate a plan shape of said body wider than its chordal length with an aspect ratio less than 2 and narrower at said straight edge than the maximum body width, said body containing a series of through passageways for air flow distributed along said straight trailing edge and extending from one of said airfoil surfaces to the other, at least one of which passageways slants rearward and downward through said body and at least one other of which passageways slants rearward and upward through said body, the said passageways being disposed in number and arrangement to enable the total upward flow of air as well as the total downward flow of air therethrough to be equalizable in pitch effect on opposite sides of the vertical plane of symmetry of the aircraft, movable closure means to control the flow of air through said passageways, and means to operate said closure means.

2. An aircraft as defined in claim 1, in which the maximum width of the said body bears a proportion to its chordal length falling between the ratios of 8 to 5 and 6 to 5.

3. An aircraft as defined in claim 1, together with stabilizing means reactive to air at the said straight trailing edge between each lateral extremity thereof and the said series of air passageways, and separate means to operate said stabilizing means.

DOUGLAS BOYCE BAUMAN.